US006860470B2

(12) United States Patent
Schaefer et al.

(10) Patent No.: US 6,860,470 B2
(45) Date of Patent: Mar. 1, 2005

(54) PNEUMATIC MONOPOD HOIST

(75) Inventors: Karl J. Schaefer, Everett, WA (US); John R. Amell, Woodinville, WA (US)

(73) Assignee: The Boeing Company, Chicago, IL (US)

( * ) Notice: Subject to any disclaimer, the term of this patent is extended or adjusted under 35 U.S.C. 154(b) by 20 days.

(21) Appl. No.: 10/302,021

(22) Filed: Nov. 22, 2002

(65) Prior Publication Data

US 2004/0099850 A1 May 27, 2004

(51) Int. Cl.[7] .................................................... B60P 1/00
(52) U.S. Cl. ................................ 254/93 R; 254/133 R; 254/DIG. 1; 254/DIG. 3; 254/DIG. 4
(58) Field of Search ............................ 254/93 R, 93 H, 254/133 R, 2 R, 2 B, DIG. 1, DIG. 3, DIG. 4

(56) References Cited

U.S. PATENT DOCUMENTS 2,146,403 A * 2/1939 Nilson ...................... 254/93 H
3,534,659 A 10/1970 Payson
3,552,267 A 1/1971 Bushnell, Jr.
4,523,512 A 6/1985 Hessel et al.
4,572,480 A * 2/1986 Heintzmann et al. ..... 254/93 R
4,715,760 A * 12/1987 Browning ................. 254/93 H
5,099,748 A 3/1992 Neubauer
D338,310 S 8/1993 Clarke
2002/0056360 A1 5/2002 Shteynberg

OTHER PUBLICATIONS

Telpro Inc., PANLIFT Brand Mode 138–2 Wallboard Lift found at: www.contractorstools.com/telpanlift.html.
Genie Super Hoist found at: www.genielift.com/ml–series/ml–l–la.html.
T–JAK found at: www.tjak.com/tools.html.

* cited by examiner

*Primary Examiner*—Robert C. Watson
(74) *Attorney, Agent, or Firm*—Harness Dickey & Pierce P.L.C.

(57) ABSTRACT

A pneumatic monopod hoist that functions as a personal lifting aid. The hoist is light in weight to allow for hand transport and is sized to be used in constrained areas, such as within an aircraft fuselage. The hoist has operating controls located directly upon the housing and may be positioned at varying angles relative to a support surface, such as a floor, to provide optimum load support. The housing and the operating controls are further configured such that the housing can be held in an upright orientation with only a single hand, while the controls are activated with the same hand.

12 Claims, 3 Drawing Sheets

PNEUMATIC MONOPOD HOIST

FIELD OF THE INVENTION

The present invention generally relates to a telescoping hoist. More particularly, the present invention relates to a light weight and compact pneumatic monopod hoist that may be manually transported and positioned at a variety of different angles.

BACKGROUND OF THE INVENTION

The advantages associated with using hoists and lifts to raise items to elevated positions are widely known. Hoists and lifts are particularly useful in lifting items that are large and/or of great weight. Current hoists and lifts exist in a variety of different shapes and sizes and employ a variety of different manual and mechanical systems to perform the lifting procedure.

While conventional hoists and lifts perform adequately for their intended uses, they are all subject to improvement. Conventional hoists employ a cable, strap, or chain and must be provided with some overhead attach point. Conventional lifts push from the floor, but are often relatively heavy and cumbersome to transport for light loads. Further, both conventional lifts and conventional hoists do not typically provide for one hand operation with functional controls located on the hoist and do not allow the user to support a load from angles other than perpendicular.

Thus, there is a need in the art for a hoist/lift that does not require an overhead attach point, that is light in weight to permit hand transport and that can be sized to permit use in constrained areas. Further, there is a need for a hoist/lift that permits one hand operation with functional controls located upon the hoist. Finally, there is a need for a hoist/lift that may be manually supported and allows the user to vary the angle at which the hoist/lift extends and supports the load.

SUMMARY OF THE INVENTION

The present invention overcomes the prior art deficiencies by providing a hoist that functions as a personal lifting aid. The hoist raises from the floor and does not require an overhead attach point or the associated cables, straps, or chains. The hoist is light in weight to allow for hand transport and is sized to be used in constrained areas, such as within an aircraft fuselage. The hoist may have operating controls located directly upon the hoist and the hoist may be positioned at varying angles to provide optimum load support.

In one preferred form the hoist comprises an elongated housing of dimensions making it easily carried by an individual. Disposed within the housing is an actuator subsystem. The actuator subsystem includes a linearly extendable and retractable member and is adapted to be operatively coupled to a pressurized fluid source such that the member can be urged into an extended position in response to the application of a pressurized fluid from the pressurized fluid source. A control panel is operatively associated with the housing to enable an operator to control the actuator subsystem to cause controlled extending and retracting movement of the member. Further, the hoist may comprise an end effector operably associated with the member for supporting at least a portion of an external object thereon at a desired height above a floor upon which the housing is resting.

Further areas of applicability of the present invention will become apparent from the detailed description provided hereinafter. It should be understood that the detailed description and specific examples are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiments is merely exemplary in nature and is in no way intended to limit the invention, its application, or uses.

Figure 1:
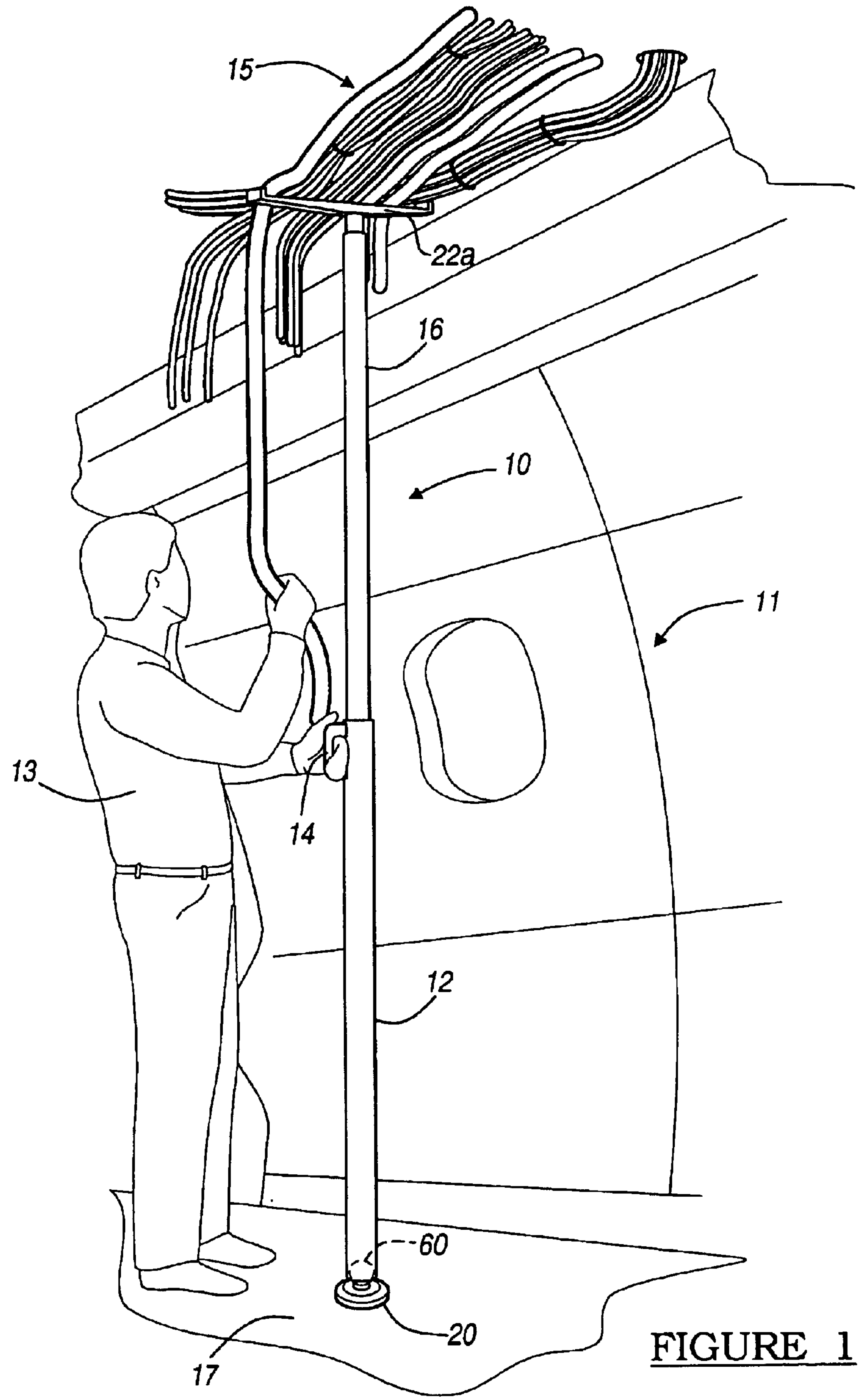
FIG. 1 is a illustration of an exemplary pneumatic hoist of the present operation being operated by an operator in an exemplary environment.
Figure 2:
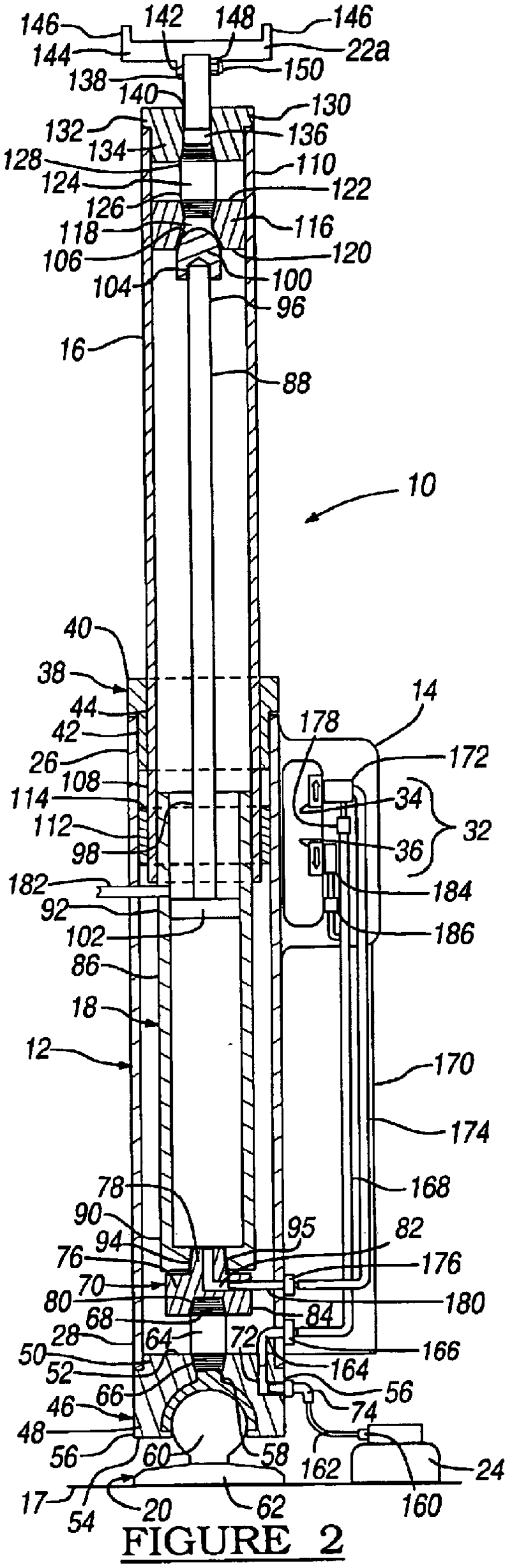
FIG. 2 is a cross-sectional view of the hoist of FIG. 1, the hoist being illustrated in an extended position.

Referring to FIG. 1, an apparatus 10 according to the present invention is shown. The apparatus 10 is shown in use in an exemplary environment, such as an aircraft fuselage 11. The apparatus 10 is being operated by an operator 13 and is being used to support a variety of different cables 15. As illustrated in FIG. 1, the apparatus 10 may be seated upon a floor 17 and operated by the operator 13 using a single hand. However, it must be appreciated that the apparatus 10 may be used in a variety of different environments to support a variety of different items and is not limited to use within aircraft fuselage 11 to support cables 15.

Referring to FIGS. 2–5, the apparatus 10 will be described in greater detail. The apparatus 10 is generally a hoist that includes a housing 12, a control handle 14, a telescoping member 16, an actuator 18, a housing support member 20, an end effector 22, and a pressurized fluid supply 24.

Housing 12 is generally comprised of an elongated cylinder. The housing 12 may be of numerous shapes and sizes depending upon the particular application for which it is to be used. The housing 12 is made of any suitable material, but is preferably made of a light weight, rigid metal. It will be appreciated that the desired length of the hoist 10 and load that it needs to be able to support are considerations in selecting the length and diameter of the housing 12.

The housing 12 generally has a first end 26 and a second end 28. Secured at or near first end 26 is a control handle 14. Control handle 14 provides a surface for the operator to grasp when transporting, maneuvering, and operating hoist 10. Located on handle 14 are operating controls 32. Operating controls 32 control the movement of actuator 18. Controls 32 preferably include an up control 34 and a down control 36. While controls 32 are preferably secured to the housing 12 via handle 14, it should be noted that the controls 32 may be positioned at any point on the housing 12 where they can be conveniently accessed by an operator. Further, the controls 32 may be detached from housing 12 and located on a remote device if desired.

The first end 26 terminates in a fixed guide bushing 38. The bushing 38 is secured to first end 26 in any suitable manner, such as being pinned, pressed within, or glued to housing 12. The guide bushing 38 has a first portion 40 and a second portion 42. First portion 40 has a diameter that is slightly larger than the diameter of the second portion 42. The diameter of the first portion 40 is equal to the outer diameter of the housing 12. The diameter of the second portion 42 is slightly smaller than the inner diameter of the housing 12. Thus, second portion 42 of bushing 38 is sized to fit within housing 12 while the first portion 40 is sized to sit upon, and flush with, the exterior of housing 12. Extending through the first portion 40 and the second portion 42 is an aperture 44.

The second end of housing 12 terminates in a base plug 46. The base plug 46 includes a base portion 48 and a recessed portion 50. In the illustrated embodiment, the diameter of base portion 48 is equal to the outer diameter of the housing 12, however, the base portion 48 may be larger to accommodate additional features such as a fluid pressure regulator. The diameter of recessed portion 50 is slightly smaller than the inner diameter of housing 12. Thus, the recessed portion 50 is sized to fit within the housing 12 while the base portion 48 extends from the housing 12.

The base plug 46 further includes a top portion 52, a bottom portion 54, two side portions 56, and a through bore 58 extending between top portion 52 and bottom portion 54. Proximal to bottom portion 54, through bore 58 is rounded to receive a ball connector 60 of housing support member 20. Housing support member 20 is comprised of an elongated planar base portion 62 of a sufficient length to provide a stable base for housing 12 and its contents upon a suitable surface, such as floor 17. Cooperation between ball connector 60 and through bore 58 allows the housing 12 to pivot upon ball connector 60 and associated planar base portion 62. This cooperation between ball connector 60 and through bore 58 allows the hoist 10 to be positioned on floor 17 at a variety of different angles relative to the floor 17.

Seated within through bore 58 at top portion 52 is an elongated cylinder or nipple 64. The nipple 64 can be of different lengths and permits the adjustment of the position of the cylinder 18 within the housing 12. The nipple 64 is made from any suitable material, such as PVC pipe. Generally, the nipple 64 has a first end 66 and a second end 68, both first end 66 and second end 68 are threaded. First end 66 is received by through bore 58 which is also threaded at top portion 52. The second end 68 is received by an air input adaptor 70. Thus, nipple 64 connects air input adaptor 70 to base plug 46.

Base plug 46 also includes an air through bore 72 extending from side portion 56 to top portion 52. At side portion 56, through bore 72 receives a suitable fluid line connector 74. Preferably, the portion of through bore 72 proximal to side portion 56 and the fluid line connector 74 are each threaded so that cooperation between the threads strengthens the connection.

Air input adaptor 70 is generally comprised of a main body 76 with a boss 78 extending from the main body 76. Boss 78 is preferably threaded and received by actuator 18 to secure the actuator 18 within the housing 12. Within main body 76 is a lower aperture 80 and a through hole 82. Lower aperture 80 receives the second end 68 of nipple 64 and is preferably threaded. Through hole 82 extends from side portion 84 through boss 78 to provide communication between the interior of housing 12 and the actuator 18.

While the actuator 18 is illustrated as being seated within the housing 12 and within the telescoping member 16, one skilled in the art will realize that the actuator 18 may be directly outfitted with the housing support member 20 and the end effector 22 to independently support a variety of different objects at different heights. However, the placement of the actuator 18 within the housing 12 and within the telescoping member 16 is preferred as the housing 12 and the telescoping member 16 isolate the actuator from side loads experienced by the actuator 18 during lifting.

The actuator 18 may be any suitable actuator but is preferably a pneumatic actuator. The actuator 18 is generally comprised of a main cylinder 86 and a push rod 88 seated within main cylinder 86. Main cylinder 86 generally includes a first end 90 and a second end 92. The first end 90 terminates in an aperture 94 that receives boss 78 to secure the main cylinder 86 to input adaptor 70. Aperture 94 contains a through bore 95 to allow air to flow from through hole 82 to actuator 18.

The push rod 88 extends from and contracts within main cylinder 86. The push rod 88 generally has a first end 96 and a second end 98. In the illustrated embodiment, the push rod 88 is cylindrical, however, the push rod 88 may be of various other shapes. The first end 96 is threaded to receive rod cap 100. The second end 98 terminates in a piston 102 that centers the push rod 88 within the main cylinder 86 and provides a seal between the push rod 88 and the main cylinder 86 to prevent air below the push rod 88 from passing above the piston 102.

The rod cap 100 includes a threaded aperture 104. Threaded aperture 104 is sized to receive and cooperate with the threads of the first end 96 of push rod 88. Opposite threaded aperture 104 is a rounded surface 106.

Telescoping member 16 is seated within housing 12 over actuator 18. The telescoping member 16 extends from the first end 26 through fixed guide bushing 38. The telescoping member 16 has a first end 108 and a second end 110. Affixed to the first end 108 is a sliding guide bushing 112. The sliding guide bushing 112 is preferably cylindrical with a center aperture 114 sized to securely receive telescoping member 16. The sliding guide bushing 112 may be affixed to the telescoping member 16 in any suitable manner but is preferably pinned. The presence of guide bushing 112 insures that the telescoping member 16 remains axially centered within the housing 12.

Seated within second end 110 of telescoping member 16 is a driver plug 116. The driver plug 116 contains a tapered bore 118. The bore 118 is tapered such that it is wider at a first surface 120 than it is at a second surface 122. The first surface 120 of bore 118 receives the rounded surface 106 of rod cap 100. The tapered bore 118 insures that the rod cap 100, and associated push rod 88, remain centered within both the driver plug 116 and telescoping member 16. The bore 118 is preferably threaded proximate to second surface 122.

Secured to the bore 118 at the second surface 122 is a nipple 124. The nipple 124 is preferably made of PVC pipe and may be adjustable to adjust the reach of the end effector 22. Nipple 124 is an elongated, preferably cylindrical, member with a first end 126 and a second end 128. Both ends 126, 128 are preferably threaded. The nipple 124 may be made of any suitable material but is preferably made from PVC pipe. First end 126 is held secure within the bore 118 due to cooperation between the threaded apertures of first end 126 and second end 128. Second end 128 is received by top plug 130. The nipple 124 serves as a bury for a support rod 138.

Top plug 130 is seated within second end 110 of telescoping member 16. Top plug 130 is preferably cylindrical and preferably has a large diameter portion 132 and a small diameter portion 134. The diameter of large diameter portion 132 is preferably equal to the outer diameter of the telescoping member 16, but may have a larger diameter to accommodate the requirements of special end effectors. The diameter of small diameter portion 134 is slightly smaller than the inner diameter of the telescoping member 16. Thus, when the top plug 130 is seated within telescoping member 16 the small diameter portion 134 fits within the telescoping member 16 and the large diameter portion 132 sits flush with the outer surface of the telescoping member 16.

Extending through top plug 130 is a bore 136. The bore 136 is preferably a tapered bore that is widest at the surface of small diameter portion 134 and most narrow within large diameter portion 132. The bore 136 preferably tapers at a point within small diameter portion 134.

The portion of bore 136 within small diameter portion 134 is preferably threaded to receive the threaded portion of the second end 128 of nipple 124 and to secure the nipple 124 to the top plug 130. The portion of bore 136 within large diameter portion 132 is also preferably threaded and is sized to receive a support device such as the support rod 138.

Support rod 138 is preferably a cylindrical rod having a first end 140 and a second end 142. The first end 140 is preferably threaded. The first end 140 is secured to the large diameter portion 132 of top plug 130 through interaction between the threads of first end 140 and the threads of bore 136. A portion of the second end 142 is machined flat to engage and support end effector 22.

End effector 22 may comprise a wide variety of shapes/configurations. Various configurations are shown as alternative embodiments 22A, 22B, and 22C illustrated in FIGS. 1, 2, and 3 respectively. As illustrated in FIG. 1, bracket 22A is generally comprised of a base plate 144 that is elongated and cylindrical. The base plate 144 terminates in two side supports 146 that extend from the base plate 144 at right angles. The base plate 144 contains an aperture 148 for receiving the second end 142 of support rod 138. The aperture 148 is preferably placed at a mid-point between the side supports 146. The rod 138 is secured within the aperture 148 in any suitable manner, such as through the use of a suitable fastener 150.

Figure 3:
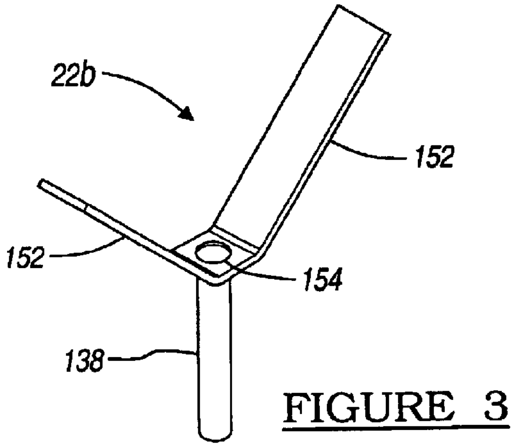
FIG. 3 is a perspective view of a "V" shaped end effector of the present invention.

As illustrated in FIG. 3, end effector 22B is formed as a "V" shaped bracket. Specifically, the end effector 22B has two elongated portions 152 extending from a common point at an angle of less than 180 degrees. This configuration is ideal for supporting cylindrical items (such as pipes and ducts) upon the bracket 22B. Bracket 22B further comprises an aperture 154 between the two elongated portions 152 for receipt of rod 138.

Figure 4:
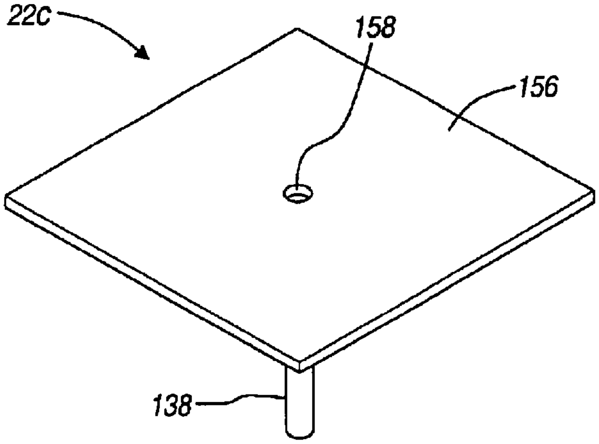
FIG. 4 is a perspective view of a planar end effector of the present invention.

End effector 22C, illustrated in FIG. 4, includes a planar surface 156. Centered upon planar surface 156 is an aperture 158 for receipt of rod 138. Planar surface 156 provides bracket 22C with a large support area to support larger items having a planar surface or configuration.

In addition to using the end effector 22 to support items at elevated positions, as described above, the end effector 22 may be used to support and operate various tools or other devices. For example, end effector 22 may be configured to mount and operate a drill to effectuate drill operation at extended heights. Activation and deactivation of device 10 preferably effectuates activation and deactivation of the drill. Alternatively, individual controls for the operation of the drill may be placed on the hoist 10.

The operation of the pneumatic host 10 will now be described in detail. Push rod 88 actuates within main cylinder 86 in response to the presence or absence of air within the main cylinder 86. When the main cylinder 86 is filled with a pressurized fluid, the push rod 88 extends from within the main cylinder 86 and pushes telescoping member 16 out of main housing 12 (FIG. 1). Push rod 88 remains extended until the fluid within the cylinder 86 is released.

The fluid introduced to main cylinder 86 is supplied by pressurized fluid supply 24. Fluid supply 24 preferably comprises a pressurized air supply source. Air produced by air supply 24 exits the fluid supply 24 by way of outlet valve 160 and is directed to through bore 72 at the side portion of base plug 46 via air line 162.

Air introduced to through bore 72 exits base plug 46 at top portion 52 and is directed, via air line 164, out of housing 12 through outlet valve 166. From outlet valve 166 the air travels through air line 168 along the exterior of the housing 12 within a protective shroud 170. The shroud 170 is secured to the exterior of the housing 12. The air flow terminates at an up valve 172 when the up valve 172 is closed. When up control 34 is depressed, up valve 172 opens to allow air to flow through up valve 172 and into the housing 12 through an air line 174 and an input port 176. Up valve 172 remains open until the up control 34 is no longer depressed. As soon as the operator releases the up control 34, the up valve 172 closes. It must be noted that the type and configuration of valve 172 may vary according to the particular operation being supported by the hoist 10.

Located between the up valve 172 and the input port 176 is an optional metering valve 178. The metering valve 178 limits the air flow to the actuator 18. Although actuator 18 is essentially a pressure sensitive device, high air flow can result in excessive extension speed of cylinder rod 88 under certain conditions, such as loads consistently lighter in weight than the cylinder was selected for, given a fixed fluid pressure.

From the input port 176, air flow is directed to air input adaptor 70 by way of air line 180. Air line 180 is connected to through hole 82 to permit air flow through the air input adaptor 70 and into the actuator 18 by way of boss 78. The compressed air entering main cylinder 86 causes the push rod 88 to extend from within the main cylinder 86. Air previously present within main cylinder 86 above the piston 102 exits the main cylinder 86 by way of exit port 182. Because the push rod 88 is connected to telescoping member 16, the extension of push rod 88 also results in the extension of telescoping member 16.

It must be realized that the above described introduction of air to the actuator 18 is merely exemplary and that there are many other ways in which air may be directed to the actuator 18. For example, air having passed through up valve 172 need not first be introduced to air input adaptor 70 but may be directly introduced to the first end 90 of the main cylinder 86 using any suitable connector.

Figure 5:
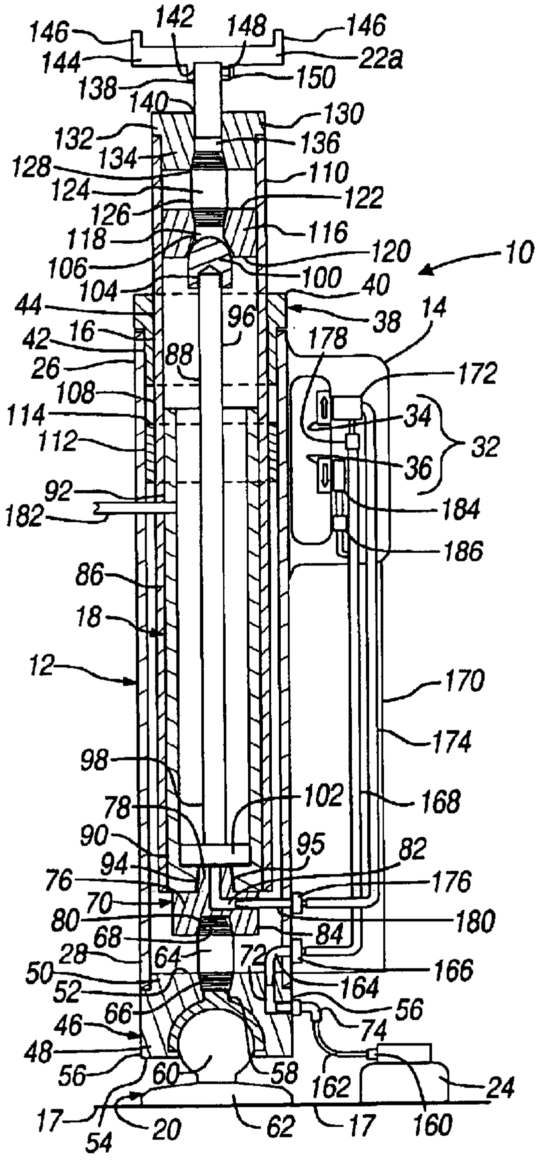
FIG. 5 illustrates the pneumatic monopod hoist of FIG. 1 in a retracted position.

When the down control 36 is pressed a down valve 184 opens to permit the air within the main cylinder 86 to be vented to atmosphere. As the air exits the main cylinder 86 the air pressure within the main cylinder 86 decreases and allows gravity (and the weight of any object being supported on the end effector 22A) to force telescoping member 16 and push rod 88 back within main cylinder 86 (FIG. 5). Optionally, a down metering valve 186 may be inserted before down valve 184 to restrict how rapidly the air that flows from main cylinder 86 is vented to atmosphere, thus providing a controlled retraction of telescoping member 16 and push rod 88. It must be noted that the type and configuration of valve 184 may vary according to the specific operation being supported by the hoist 10. Further, it must be noted that the position and/or use of the valve 172 and the valve 184 may also vary according to the operation being supported by the hoist 10.

Figure 6:
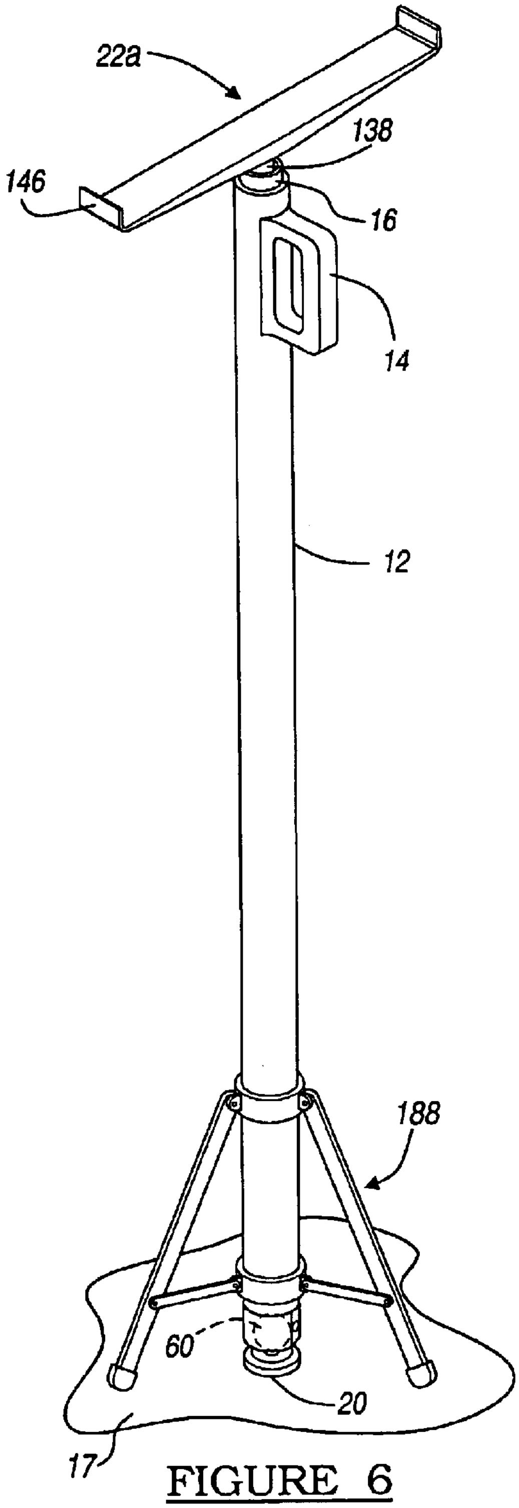
FIG. 6 illustrates the pneumatic monopod hoist of FIG. 1 supported in an upright position by an optional, folding tri-pod support.

In use, the operator manually transports the hoist 10 to the point where lift assistance is necessary and places the swivel foot housing support member 20 in the desired location. Depending upon the position of the load being supported, the operator may pivot the housing 12 about the housing support member 20 to better angle the hoist 10 to support the load. Optionally, the hoist 10 may be outfitted with a suitable support stand, such as a tripod stand 188 as seen in FIG. 6.

When configured with the tripod stand 188, the hoist 10 may further include a device within the base plug 46, such as a small pneumatic cylinder, that retracts and extends support member 20 within the base plug 46. Advantageously, when the up control 34 is depressed to raise the telescoping member 16, the optional small pneumatic cylinder within the base plug 46 extends the support member 20 from within the base plug 46 to support the hoist 10. When the down control 36 is depressed to collapse the support member 20, the small pneumatic cylinder within the base plug 46 retracts the support member 20 within the base plug 46 to permit the hoist 10 to be self supported by the tripod stand 188.

Once the hoist 10 is properly positioned, the user preferably supports the device at the control handle 14, however, it will be realized that the user may support the device at any point. Supporting the device at control handle 14 is preferred as it provides the user with easy access to operating controls 32. When the user is ready to support the desired load, the user presses up control 34 to open up valve 172 and extend telescoping member 16 as described above. The length to which the telescoping member 16 extends is proportional to the duration for which the up control 34 is pressed. Thus, the longer up control 34 is held, the further the push rod 88 extends. Conveniently, the operator can not only hold the apparatus with a single hand, but can also activate it with the same hand. This leaves operator's other hand free to help stabilize the object being supported on the end effector 22A if needed. The narrow diameter of the housing support member further allows the hoist 10 to be used on surfaces where a large, planar area is not available.

When it is no longer necessary to support the load, the user presses down control 36. As described above, activation of down control 36 opens down valve 184 and allows gravity to force telescoping member 18 and push rod 88 back within main cylinder 86 (FIG. 5). After telescoping member 18 recedes within main cylinder 86, the user may then transport the hoist 10 to another position to perform an additional lifting procedure.

Thus, the present invention provides for a hoist 10 that functions as a readily portable and convenient personal lifting aid. The hoist 10 is light in weight to allow for hand transport and can be built with dimensions making it ideal for use in constrained areas, such as within an aircraft fuselage. The hoist 10 may have operating controls 32 located directly upon the housing 12 and may be positioned at varying angles to provide optimum load support.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A hoist for raising an item to elevated positions comprising;

an elongated housing having a first end and a second end;

an actuator seated within said housing, said actuator being in communication with said air supply, said actuator including a main cylinder and a push rod extending from within said main cylinder and said first end in response to the introduction of air within said main cylinder by said air supply, said push rod retracting within said main cylinder when said air is released from within said main cylinder;

a telescoping member positioned within said housing and upon said push rod, said telescoping member extending from and receding within said first end of said housing in response to movement of said push rod;

an end effector secured to said telescoping member for supporting a load; and a housing support member disposed at said second end of said housing and angled to rest on a floor surface, said housing support member providing a base upon which said housing may be positioned at a variety of different angles relative to said floor surface.

2. The pneumatic monopod hoist of claim 1, Wherein said end effector comprises:

an elongated base plate; and at least two side supports extending from said elongated base plate at right angles.

3. The pneumatic monopod hoist of claim 1, wherein said end effector comprises:

two elongated portions extending from a common point at an angle of less than 180 degrees.

4. The pneumatic monopod hoist of claim 1, wherein said end effector comprises:

a planar surface for supporting items.

5. The pneumatic monopod hoist of claim 1, wherein actuation of an up control opens an up valve to permit said air from said air source to enter said main cylinder and push said push rod and said telescoping member from within said housing.

6. The pneumatic monopod hoist of claim 2, further comprising a metering valve to regulate the amount of said air entering said main cylinder.

7. The pneumatic monopod hoist of claim 1, wherein actuation of a down control opens a down valve to permit said air within said main cylinder to exit said main cylinder and allows said push rod and said telescoping member to recede within said housing.

8. The pneumatic monopod hoist of claim 4, further comprising a metering valve to regulate the amount of said air exiting said main cylinder.

9. The pneumatic monopod hoist of claim 1, wherein said housing support member comprises:

an elongated base portion; and a ball connector extending from said base portion;

wherein said ball connector is received by a rounded through bore of said main base to provide a swivel connection between said housing support member and said main base.

10. The pneumatic monopod hoist of claim 1, wherein said housing includes a handle for positioning said hoist and transporting said hoist.

11. The pneumatic monopod hoist of claim 7, wherein said handle includes functional controls for operating said hoist.

12. The pneumatic monopod hoist of claim 1, further comprising a tri-pod to assist in supporting said housing.

* * * * *